(12) United States Patent
Dinan et al.

(10) Patent No.: US 8,423,035 B1
(45) Date of Patent: Apr. 16, 2013

(54) DYNAMIC UPLINK/DOWNLINK CAPACITY ALLOCATION IN A COMMUNICATION NETWORK

(75) Inventors: Esmail Hejazi Dinan, Herndon, VA (US); Vijay Rudraraju, Herndon, VA (US); Howard Bishop Anderson, Ashburn, VA (US); Hemanth Balaji Pawar, Herndon, VA (US); Daniel A. Vivanco, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 716 days.

(21) Appl. No.: 12/169,704

(22) Filed: Jul. 9, 2008

(51) Int. Cl.
*H04W 72/00* (2006.01)

(52) U.S. Cl.
USPC ........ 455/450; 455/452.2; 455/509; 370/329; 370/468

(58) Field of Classification Search ....... 455/450–452.2, 455/464
See application file for complete search history.

(56) References Cited

U.S. PATENT DOCUMENTS

| | | | |
|---|---|---|---|
| 6,985,736 B1* | 1/2006 | Aalto | 455/447 |
| 7,324,478 B2* | 1/2008 | Park et al. | 370/331 |
| 7,502,596 B2* | 3/2009 | Takao et al. | 455/78 |
| 7,756,520 B2* | 7/2010 | Hashem et al. | 455/450 |
| 2002/0055360 A1* | 5/2002 | Chen et al. | 455/452 |
| 2002/0098821 A1* | 7/2002 | Struhsaker | 455/305 |
| 2005/0259629 A1 | 11/2005 | Oliver et al. | |
| 2006/0014528 A9* | 1/2006 | Hsu et al. | 455/414.1 |
| 2006/0121855 A1* | 6/2006 | Dillon | 455/69 |
| 2009/0131065 A1* | 5/2009 | Khandekar et al. | 455/452.1 |

OTHER PUBLICATIONS

Oleg Gusak, et al., "Performance Evaluation of the 802.16 Medium Access Control Layer," Lecture Notes in Computer Science, Oct. 29, 2004, 2 pages, vol. 3280/2004, Springer Berlin/Heidelberg, Kansas City, Missouri; Parsippany, New Jersey.

Sung Won Kim, et al., "Downlink and Uplink Resource Allocation in IEEE 802.11 Wireless LANs," Vehicular Technology, Jan. 2005, 1 page, vol. 54, Issue 1, IEEE Xplore.

* cited by examiner

*Primary Examiner* — Marcos Batista
*Assistant Examiner* — Keith Fang
(74) *Attorney, Agent, or Firm* — O'Brien Jones, PLLC (57) ABSTRACT

A method is provided for dynamically allocating capacity to uplinks and downlinks in a communication network. In the method, base stations of the communication network are apportioned into groups. Each of the base stations communicates over an uplink and a downlink with communication devices. For each of the groups, a first indication of utilization of the uplink for each of the base stations of the group is received. Also received is a second indication of utilization of the downlink for each of the base stations of the group. A capacity allocation between the uplinks and the downlinks of the base stations of the group is determined based upon the first and second indications. The capacity allocation is then employed for each of the base stations of the group.

16 Claims, 7 Drawing Sheets

DYNAMIC UPLINK/DOWNLINK CAPACITY ALLOCATION IN A COMMUNICATION NETWORK

TECHNICAL BACKGROUND

Wireless communication networks typically employ base stations which are configured to communicate with wireless communication devices, such as cell phones, personal disgital assistants (PDAs), and the like. Each of these base stations may utilize separate uplink and downlink channels for communication between the base stations and the communication devices, with the uplink carrying information from the devices to the base station, and the downlink transporting information from the base station to the devices. Depending on the type of wireless system implemented, multiple communication devices may each employ a separate sub-channel within the uplink or downlink channel so that the devices may communicate with the base station concurrently.

Oftentimes, the uplink and downlink of a base station share a common resource, such that more of the resource being allocated to the uplink results in less of that same resource being reserved for the downlink. For example, in a time-division-duplex (TDD) system, a portion of a recurring predetermined period of time is allocated for the uplink, while the remainder of the time period is allocated for the downlink. Under this protocol, the base station transmits to the communication devices over the downlink while the devices refrain from transferring data to the base station via the uplink, and vice versa. Other resources, such as a number of wavelengths or a total communication bandwidth, may be shared between the uplink and the downlink in a similar manner in other communication systems.

OVERVIEW

Discussed herein is a method for dynamically allocating capacity to uplinks and downlinks in a communication network. In the method, base stations of the communication network are apportioned into groups, wherein each of the base stations communications over an uplink and a downlink with communication devices. For each of the groups, a first indication of utilization of the uplink for each of the base stations of the group is received. Also received is a second indication of the utilization of the downlink for each of the base stations of the group. A capacity allocation between the uplinks and the downlinks of the base stations of the group are determined based on the first and second indications for each of the base stations of the group. The capacity allocation is employed for each of the base stations of the group. The method may also be embodied in a computer-readable medium including instructions executable on a processor for employing the method.

Also presented herein is a node for a communication network that includes an interface and a processor. The interface is configured to communicate with a plurality of base stations of the communication network. Each of the plurality of base stations is configured to communicate over an uplink and a downlink with communication devices. The processor is configured to apportion the plurality of base stations into one or more groups. For each group, the processor is configured to receive a first indication of utilization of the uplink of each of the base stations of the group and a second indication of utilization of the downlink of each of the base stations of the group over the interface. The processor is also configured to determine a capacity allocation between the uplinks and downlinks of the base stations of the group based on the first and second indications from each of the base stations of the group. The processor is further configured to transmit an indication of the capacity allocation to each of the base stations in the group over the interface.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated figures depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
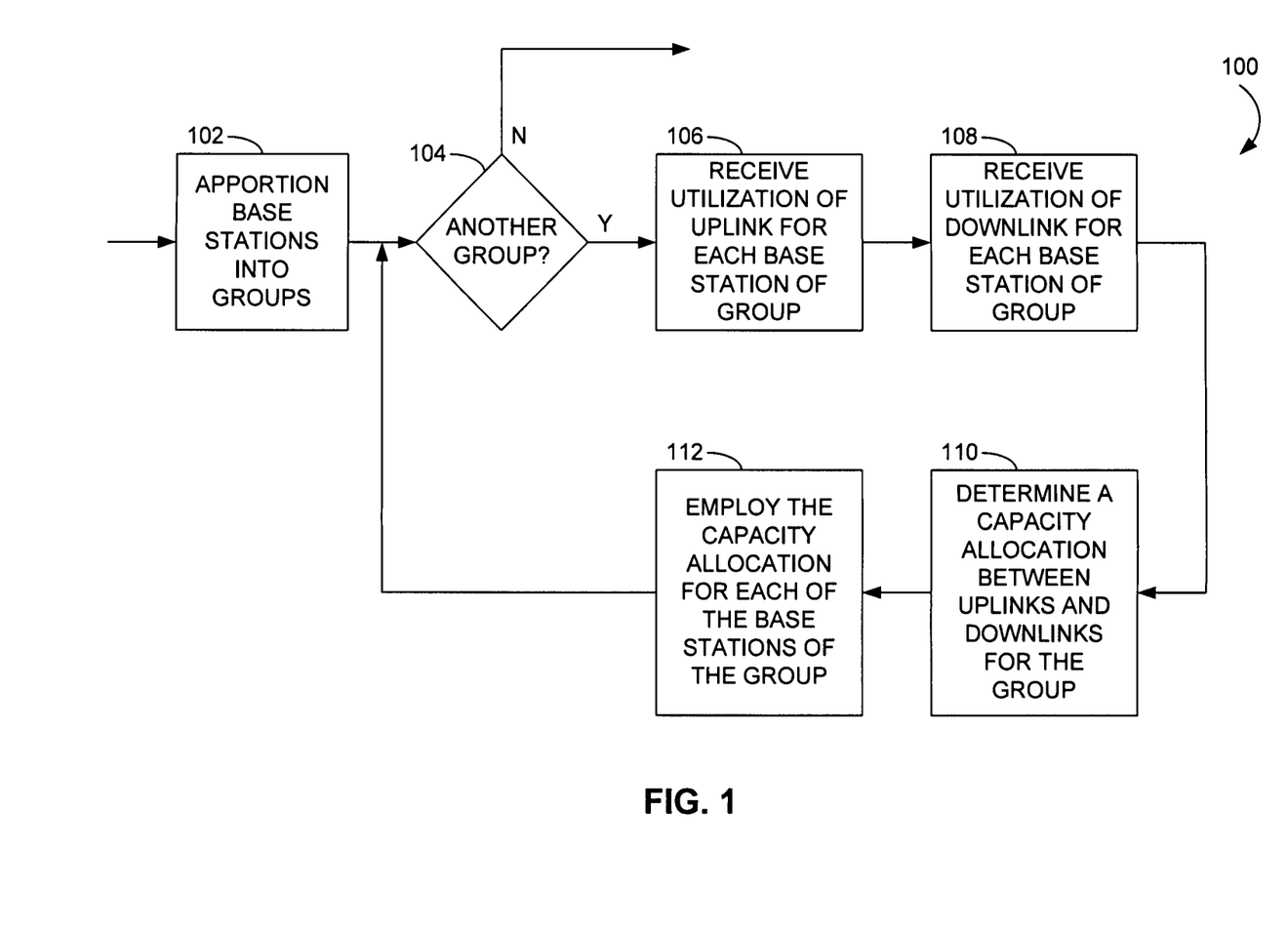
FIG. 1 is a flow diagram illustrating a method according to an embodiment of the invention for dynamically allocating capacity to uplinks and downlinks in a communication network.

FIG. 1 provides a flow diagram of a method 100 according to an embodiment of the invention for dynamically allocating capacity to uplinks and downlinks in a communication network. In the method 100, base stations of the network are apportioned into groups (operation 102). Each of the base stations communicates over an uplink and a downlink with communication devices, such as cellular phones, personal digital assistants (PDAs), and the like. For each of the groups (operation 104), a first indication of utilization of the uplink for each of the base stations of the group is received (operation 106). Also received is a second indication of utilization of the downlink for each of the base stations of the group (operation 108). A capacity allocation between the uplinks and the downlinks of the base stations of the groups is determined based upon the first and second indications (operation 110). The capacity allocation is then employed for each of the base stations of the group (operation 112). This method may also be employed in instructions executable by a processor that are encoded onto a computer-readable medium in another implementation of the invention.

Figure 2:
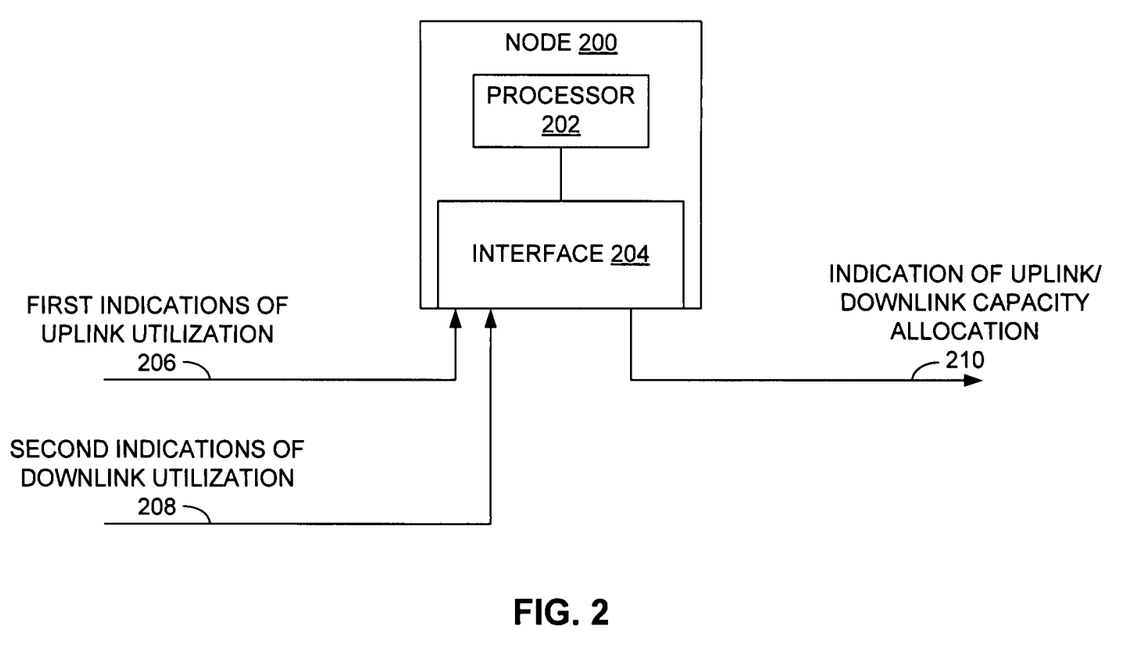
FIG. 2 is a block diagram of a node of a communication network according to an embodiment of the invention that dynamically allocates capacity to uplinks and downlinks in the network.

FIG. 2 provides another example embodiment: a node 200 for a communication network that includes a processor 202 and an interface 204. The interface 204 is configured to communicate with a plurality of base stations (not shown in FIG. 2) of the network, with each of the base stations being configured to communicate over an uplink and a downlink with a number of communication devices. The processor 202 is configured to apportion the base stations into one or more groups. For each of the groups, the processor 202 is configured to then receive a first indication 206 of utilization of the uplink of each of the base stations of the group, as well as receive a second indication 208 of utilization of the downlink of each of the base stations of that group over the interface 204. The processor 202 is also configured to determine a capacity allocation between the uplinks and the downlinks of the base stations of the group based on the first indications 206 and second indications 208 previously received. The processor 202 is also configured to transmit an indication 210 of the capacity allocation to each of the base stations of the group over the interface 204.

Figure 3:
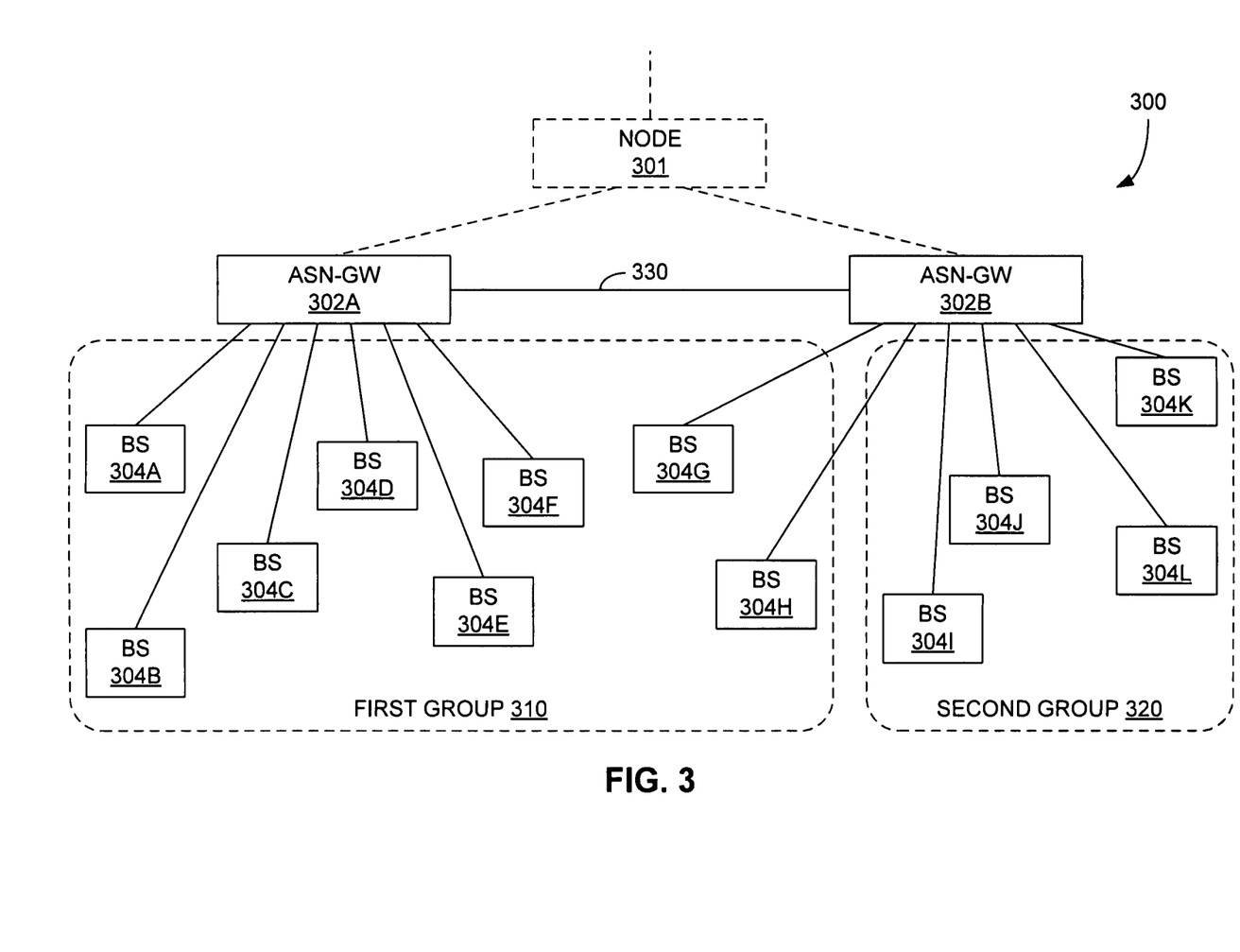
FIG. 3 is a simplified block diagram of a communication network including nodes and associated base stations apportioned into groups according to an embodiment of the invention.

FIG. 3 provides a simplified block diagram of a communication network 300 according to another embodiment of the invention. In this specific implementation, the network 300 shown represents a portion of a WiMAX (Worldwide Interoperability for Microwave Access) employing two Access Service Network gateways (ASN-GW) 302, each of which is coupled to a number base stations (BSes) 304. More specifically, a first gateway 302A is coupled to base stations 304A-304F, while a second gateway 302B is connected to base stations 304G-304L. Each of the gateways 302A, 302B may also be coupled to backhaul portions of the network 300, such as a node 301 coupled to both gateways 302, to provide connectivity to other networks, such as a public switched telephone network (PSTN), the Internet, or another wide area network (WAN) (not shown in FIG. 3).

Also, while the WiMAX network 300 provides the basis for the embodiments discussed hereinafter, other networks, including other cellular networks employing multiple base stations units, may benefit from application of the concepts presented herein. For example, other third-generation (3G) and fourth-generation (4G) wireless communication systems, such as Evolution-Data Optimized (EV-DO) and Third-Generation Partnership Project-Long-Term Evolution (3GPP LTE), may employ aspects of the embodiments as described below.

Each base station 304 sends communications to, and receives communications from, one or more wireless communication devices located within a service area of the base station 304. Such devices may include mobile devices, such as cellular phones, PDAs, laptop computers, and the like, as well as more stationary devices, such as desktop computers, network access modems, and so on. Other implementations of the base stations 304 and associated communication devices may employ communication techniques other than wireless technologies, such as wireline or optical technologies.

In FIG. 3, each of the base stations 304 communicates with its associated gateway 302 by way of separate uplink and downlink channels that share a common resource. More specifically, the uplink and downlink channels of each of the base stations 304 are implemented in a time-division-duplex (TDD) scheme in which a frame of a predetermined time length is divided into a downlink sub-frame (or channel) for transmissions from the base station 304 to the communication devices, and an uplink sub-frame (or channel) for transmissions from the communication devices to the base station 304.

Figure 4A:
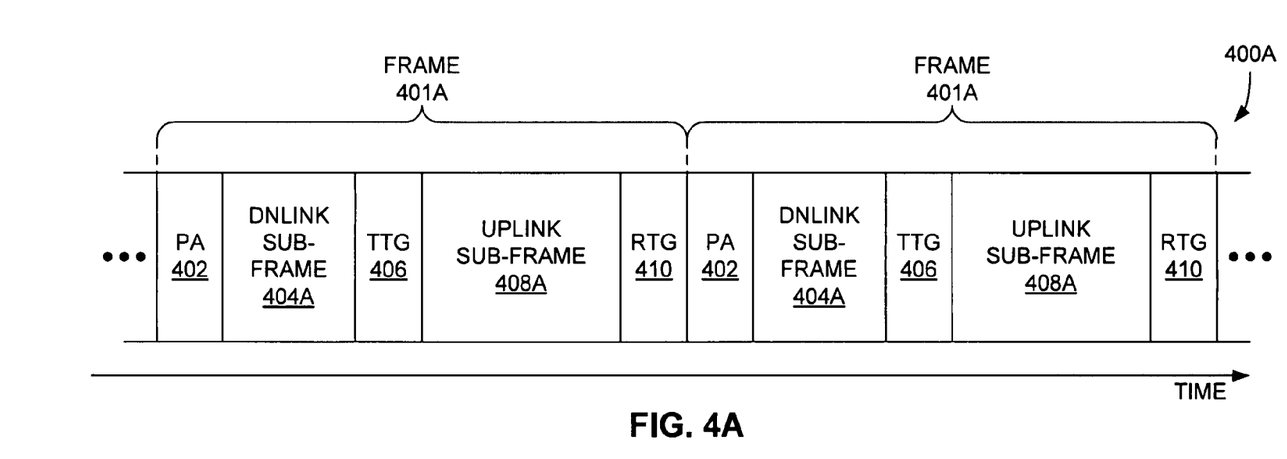
FIGS. 4A and 4B are graphical representations of communication frames containing information transferred between a base station and a plurality of communication devices according to an embodiment of the invention.
Figure 4B:
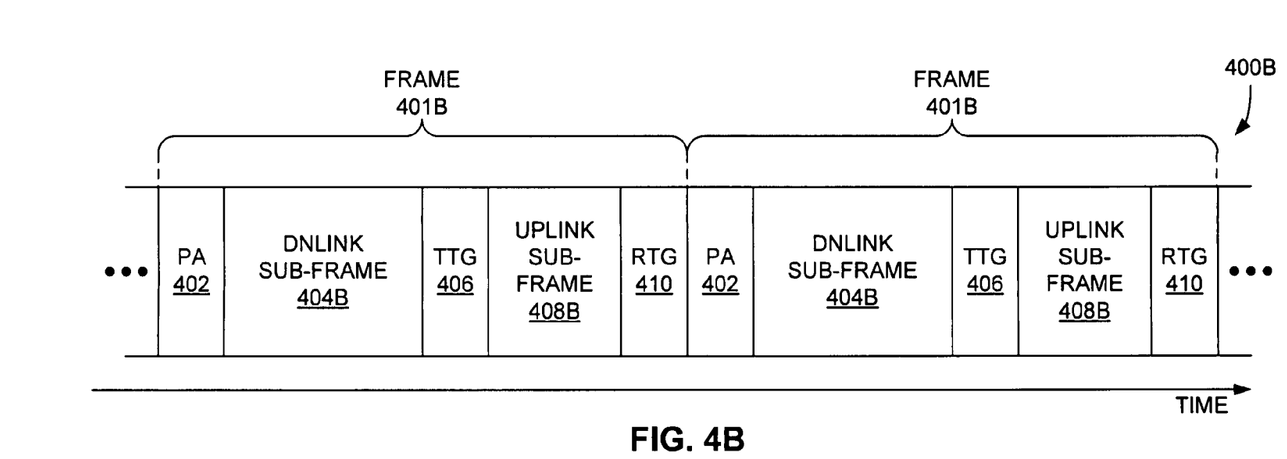

FIGS. 4A and 4B provide two graphical representations of a TDD connection between a base station 304 of FIG. 3 and communication devices associated with the base station 304. In FIG. 4A, the connection is facilitated by a series of frames 401A, two of which are explicitly shown. Each frame 401A is encountered serially, with each frame 401A occupying a predetermined length of time. Within each frame 401A is a downlink sub-frame 404A and an uplink sub-frame 408A. The downlink sub-frame 404A denotes the portion of time within each frame 401A during which the base station 304 communicates with the wireless devices it services, while the uplink sub-frame 408A represents the portion of each frame 401A during which the devices transmit to the base station 304.

As shown in FIG. 4A, each frame 401A may include other time portions other than the downlink sub-frame 404A and the uplink sub-frame 408A. For example, a preamble (PA) 402 is located prior to the downlink sub-frame 404A. Data within the preamble 402 may allow the wireless communication devices to synchronize their receiving and decoding circuitry to the data within the downlink sub-frame 404A transmitted thereafter. Also possibly included in the frame 401A is a transmit/receive transition gap (TTG) 406 occurring after the downlink sub-frame 404A and a receive/transmit transition gap (RTG) 410 following the uplink sub-frame 408A. These gaps 406, 410 provide a timing buffer between the two sub-frames 404A, 408A to reduce the possibility on interference between the sub-frames 404A, 408A. In other embodiments, these particular fields of the communication frame 401A may not be utilized. Also, other formats for the frame 401A may be used in other implementations.

In one embodiment, the downlink sub-frame 404A and the uplink sub-frame 408A may each include a number of sub-channels (not depicted in FIGS. 4A and 4B), one for each of the communication devices in communication with the base station 304. These sub-channels may be implemented within each of the sub-frames 404A, 408A via a number of methods, such as by way of a time-division basis, a frequency- or wavelength-division basis, or a code-division basis. Other methods of sharing the sub-frames 404A, 408A among the communication devices may be employed in other embodiments.

In FIG. 4A, while the length of each field in the frames 401A are not intended to be shown to scale, the uplink sub-frame 408A is depicted as occupying a greater portion of time of each frame 401A, and thus consuming a greater amount of the transmission capacity of each frame 401A, than the downlink sub-frame 404A. This allocation of the available capacity of each frame 401A may be beneficial when a greater amount of traffic is being experienced in the direction from the communication devices to the base station 304, than from the base station 304 to the devices it services. Oppositely, FIG. 4B illustrates frames 401B, each of which span the same period of time as the frames 401A of FIG. 4A, but which allocate more time for a downlink sub-frame 404B than an uplink sub-frame 408B, thus facilitating greater traffic from the base station 304 to the associated communication devices than in the opposing (uplink) direction.

To prevent interference between neighboring base stations 304, the timing of the various base stations 304 is often synchronized, such as by way of the Global Positioning System (GPS), the gateways 302, or another mechanism, so that each frame 401, as well as the sub-frames 404, 408, begin and end together, thus reducing interference between the uplinks and downlinks of the base stations 304.

In many cases, traffic patterns between a base station 304 and its corresponding communication devices may vary depending on the time of day, the particular day of the week, the particular geographic area being serviced, and many other factors. As a result, static capacity allocation between the downlink sub-frame 404 and the uplink sub-frame 408 may result in inefficient use of the capacity provided by each frame 401 from time to time. More specifically, either the downlink sub-frame 404 or the uplink sub-frame 408 may be over-utilized in comparison to the opposing link, depending on the amount of uplink or downlink traffic occurring at the time. Occasional or periodic alteration of the capacity allocation between the downlink sub-frame 404 and the uplink sub-frame 408 so that the allocation may more closely match the actual use of the two links may increase efficiency. However, alteration of the capacity allocation of the frames 401 associated with a single base station 304 may result in a timing overlap of the downlink sub-frames 404 for one base station 304 with the uplink sub-frames 408 of a nearby base station 304, and vice-versa, due to coverage overlap common in cellular and similarly constructed networks. This timing overlap may further result in uncorrectable signal interference between the downlinks and uplinks of neighboring base stations 304.

To reduce the possibility of interference between base stations 304, one or both of the gateways 302A, 302B, or a node coupled thereto, are configured to apportion the base stations 304 into one or more groups. For example, FIG. 3 shows base stations 304A-304H apportioned into a first group 310, while base stations 304'-304L are collected into a second group 320. As depicted in FIG. 3, the groups 310, 320 are determined such that the base stations 304 of each group 310, 320 service a contiguous graphical area. However, apportioning of the base stations 304 into groups may not be limited in such a fashion. Also, while only two groups 310, 320 are shown in FIG. 3, the base stations 304 may be apportioned into more than two groups in other implementations.

In one embodiment, the base stations 304 are apportioned into the groups 310, 320 to attain a minimum level of interference between base stations 304 of different groups. This apportionment may be based on any of a number of types of information. In one implementation, the base stations 304 may be grouped so that coverage overlap of base stations 304 of different groups is minimized. For example, the least amount of coverage overlap between adjacent base stations 304 in network 300 may exist between neighboring base stations 304H, 304I, thus indicating that these two base stations 304H, 304I may reside in separate groups 310, 320.

In another embodiment, the base stations 304 may be apportioned to minimize movement of mobile communication devices, or "mobile stations", between base stations 304 of different groups. Using FIG. 3 once again, travel may be more restricted between areas serviced by base stations 304H and 304I, than between other areas serviced by other adjacent base stations 304. Mobility between two such areas may be restricted by way of lack of road access between the areas, natural boundaries such as mountains or rivers, or other means.

In other implementations, the base stations 304 may be grouped according to the types of base station 304 involved, or the areas of the base stations 304 being serviced. For example, a single building may be served by several small-range base stations 304, thus indicating that those base stations 304 may be apportioned into the same group exclusive of other base stations 304. Also, the apportionment of the base stations 304 into groups may be based on any combination of data regarding interference between the base stations 304, mobility between areas served by the base stations 304, the types of base stations 304 or areas served by those base stations 304, and operational data, such as call handoff information, dropped call data, and the like.

Apportioning the base stations 304 into the various groups 310, 320 may be performed automatically by way of a computer-executed algorithm, or may be performed manually by a system operator or similar personnel affiliated with the network 300.

Figure 5:
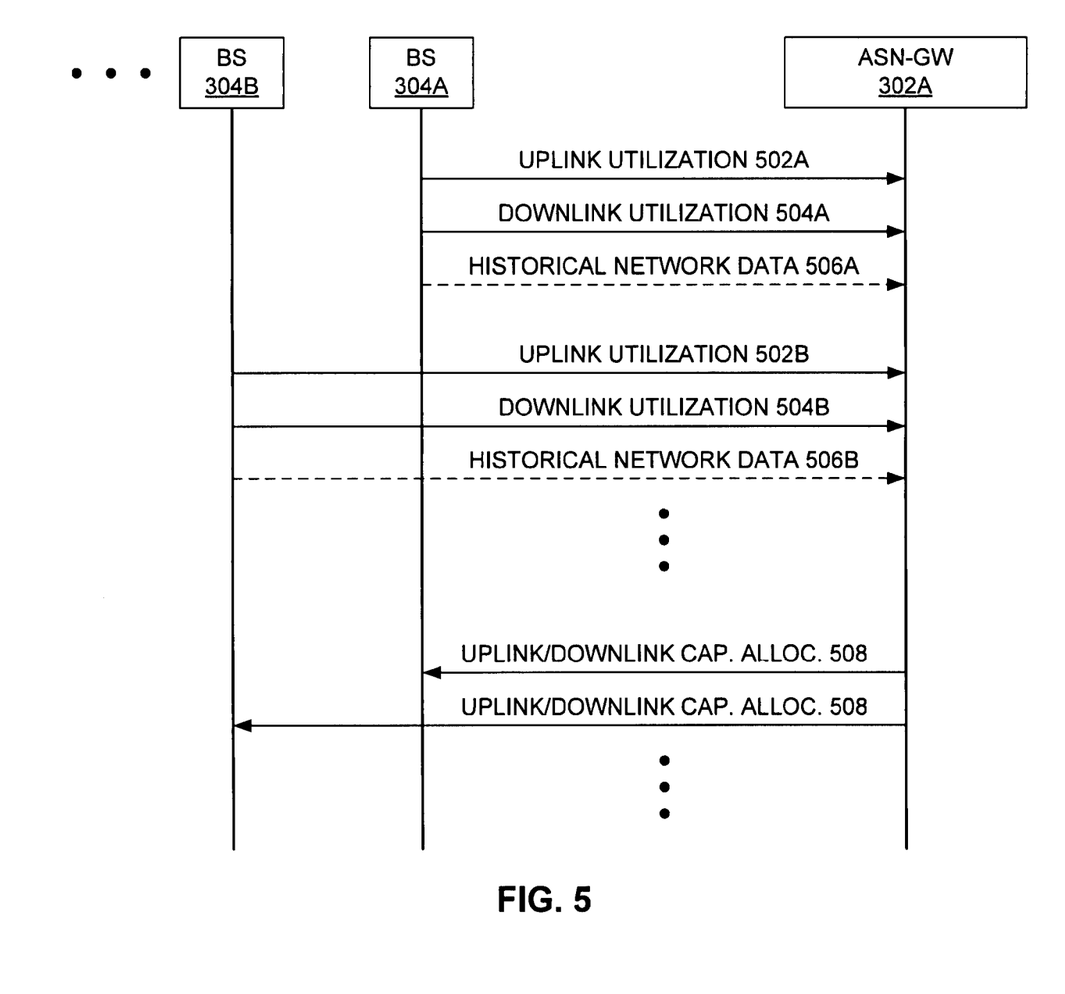
FIG. 5 is an information transfer diagram relating to the network of FIG. 3 according to an embodiment of the invention.

Once the base stations 304 have been apportioned into separate groups 310, 320, as described above, one or both of the gateways 302A, 302B may receive information regarding utilization of both the uplink and the downlink of each of the base stations 304. FIG. 5 is a graphical representation of information exchanges between the first gateway 302A and the various base stations 304 under its control. For example, an indication 502A of utilization of the uplink of base station 304A and an indication 504A of utilization of the downlink of base station 304A are transmitted from the base station 304A to its associated gateway 302. These indications reflect the utilization of the uplink and the downlink of the base station 304A given a currently-set allocation of the communication capacity available to the uplink and the downlink. This information may be transferred over a signaling channel, such as an R6 signaling interface of WiMAX linking the first gateway 302A with its associated base stations 304A-304H. Such information may instead be transported over bearer links or other connections in other implementations. Similarly, uplink utilization 502B and downlink utilization 504B for base station 304B are communicated to the first gateway 302A. The remaining base stations 304C-304H transmit their corresponding information in the same manner.

In the example of FIGS. 4A and 4B, the utilization information may include separate indications of the amount of total capacity actually being utilized, in terms of a fraction, a percentage, an amount of data, or some other metric, for each of the downlink sub-frame 404 and the uplink sub-frame 408. An indication of the utilization of each of the sub-frames 404, 408 may be transferred to the gateway 302 for each frame 401. In another example, the base station 304 may periodically average the utilization of each of the sub-frames 404, 408 over multiple frames 401 before transferring the resulting indications to its corresponding gateway 302.

In one embodiment, the first gateway 302A may also receive historical network data 506A, 506B from each of the base stations 304A, 304B, and so on, to which they are coupled. The historical network data 506 may include data regarding communication traffic patterns involving the base station 304, handoffs of communication devices in which the base station 304 has taken part, operational performance of the base station 304, and other data regarding the operation of the base station 304.

After receipt of the uplink and downlink utilization information 502, 504, and possibly the historical performance information 506, from the base stations 304, one or more of the gateways 302 may process that information to determine a new capacity allocation for the uplink and downlink for the base stations 304 within each of the groups 310, 320. Each of base stations 304 within a single group 310, 320 will employ the same capacity allocation, but different groups 310, 320 may employ different capacity allocations.

In determining the new capacity allocation, the gateway 302 or other node of the network 300 may select a capacity allocation that is likely to relieve or reduce inefficient use of the total communication capacity experienced under the current capacity allocation. In addition, to determine the new capacity allocation, the gateway 302 or other node may also take into account the current capacity allocation. For example, presuming the current capacity allocation indicated in FIG. 4A, in which more time, and hence more capacity, is devoted to the uplink sub-frame 408A in each frame, and the utilization indications 502, 504 from the base stations 304 indicate that, on average, the uplink sub-frame 408A is being underutilized, while the downlink sub-frame 404A is fully utilized, the gateway 302 may determine a new capacity allocation similar to that depicted in FIG. 4B, in which more of the available time during each frame 401B is allocated to the downlink sub-frame 404B, at the expense of the uplink sub-frame 408B. The gateway 302 may further adjust the new capacity allocation in light of the historical network data 506 described above.

Since the base stations 304 of a particular group 310, 320 may be associated with different gateways 302, each of the gateways 302 involved may cooperate in some fashion to receive the indications of utilization 502, 504, and to determine the capacity allocation. In one example, one of a number of gateways 302 may be designated as a master node for the purpose of the performing the determination. To that end, the gateways 302 associated with base stations 304 of a specific group that do not operate as a master node may forward the utilization 502, 504 and historical network information 506 they receive to the master gateway 302. In FIG. 3, the first gateway 302A may serve as the master for the first group 310. As a result, the second gateway 302B may forward the utilization 502, 504 and historical network information 506 received from base stations 304G and 304H of the first group 310 to the first gateway 302A. In a WiMAX network, the second gateway 302B may transfer this information to the first gateway 302A over an R4 interface therebetween.

In another embodiment, the gateways 302 associated with the same group may share the information received from their respective base stations 304 and perform the determination independently. In another implementation, the gateways 302 may transfer the information received from their base stations 304 to another node 301 coupled with the gateways 302 so that the other node 301 may perform the determination.

The node performing the determination of the capacity allocation, such as one of the gateways 302 or another node 301 coupled thereto, may perform the determination by any number of methods. Presuming the first gateway 302A performs this determination, the first gateway 302A may calculate a weighted average of the received indications of utilization of the uplink for each of the base stations 304A-304H of the first group 310, as well as calculate a weighted average of the utilization values for the downlink of each of the same base stations 304A-304H. The first gateway 302A may then compare or combine the two weighted averages to determine the new capacity allocation for the uplink and downlink for the base stations 304A-304H of the first group 310. The second gateway 302B may perform this same function with respect to the base stations 304'-304L of the second group 320.

In one embodiment, the first gateway 302A may eliminate those of the indications 502, 504 of utilization of the uplink and downlink for each of the base stations 304A-304H of the first group 310 that may be regarded as statistical "outliers" (i.e., those data which are unusual or extreme in comparison to the rest of the data of the same set). Such data may reflect rare or short-lived communications not typically experienced by the base station 304 associated with that data. The elimination of such data would occur prior to the calculation of the weighted averages for the uplink and downlink utilization, as described earlier.

In determining the capacity allocation for the base stations 304A-304H of the first group 310, the first gateway 302A may also consider the historical network data 506 referenced above in some implementations.

Once the first gateway 302A or another node determines the next capacity allocation between the uplink and the downlink for the base stations 304A-304H of the first group 310, the first gateway 302A may implement the allocation by transmitting an indication 508 of the allocation to each of the base stations 304A-304H, as illustrated in FIG. 5. To that end, the first gateway 302A transmits the allocation indication 508 to base stations 304A-304F to which it is coupled, and to the second gateway 302B over the R4 interface mentioned above to the second gateway 302B, which forwards the information to the base stations 304G, 304H of the first group 310. Each of the base stations 304A-304H receiving the new allocation indication 508 would then implement the new allocation in the frames 401 incorporating the uplink and downlink.

In one embodiment, the allocation indication 508 may be an uplink/downlink sub-frame ratio denoting the relative length of the uplink sub-frame 404 compared to the length of the downlink sub-frame 408. Also accompanying the indication may be an indication of the point in time at which the new allocation is to be implemented in each of the base stations 304A-304H of the first group 310. In a WiMAX implementation, this point in time may be indicated by a WiMAX time frame number designating at which particular frame 401 the new allocation is to be initiated. Also included may be a value indication the duration, such as a number of frames 401, during which the new allocation is to be utilized, after which the previous capacity allocation, or some default allocation, may be employed. Other techniques for relaying the allocation information to the base stations 304A-304H may be used in other examples.

To further limit or reduce interference between base stations 304 of different groups 310, 320, the first gateway 302A (or the second gateway 302B, or another node 301, in other implementations) may alter the length of the separation gaps between the downlink sub-frame 404 and the uplink sub-frame 408 (e.g., the TTG 406 and the RTG 410) of each frame 401 of FIGS. 4A and 4B for the base stations 304A-304H. Modification of the gaps 406, 410 may further reduce interference between two nearby base stations 304 of different groups, such base station 304H of the first group 310 and base station 304I of the second group 320. Other operational characteristics, such as handoff thresholds between base stations 304 of different groups 310, 320, may be modified to further reduce interference between those base stations 304.

Figure 6:
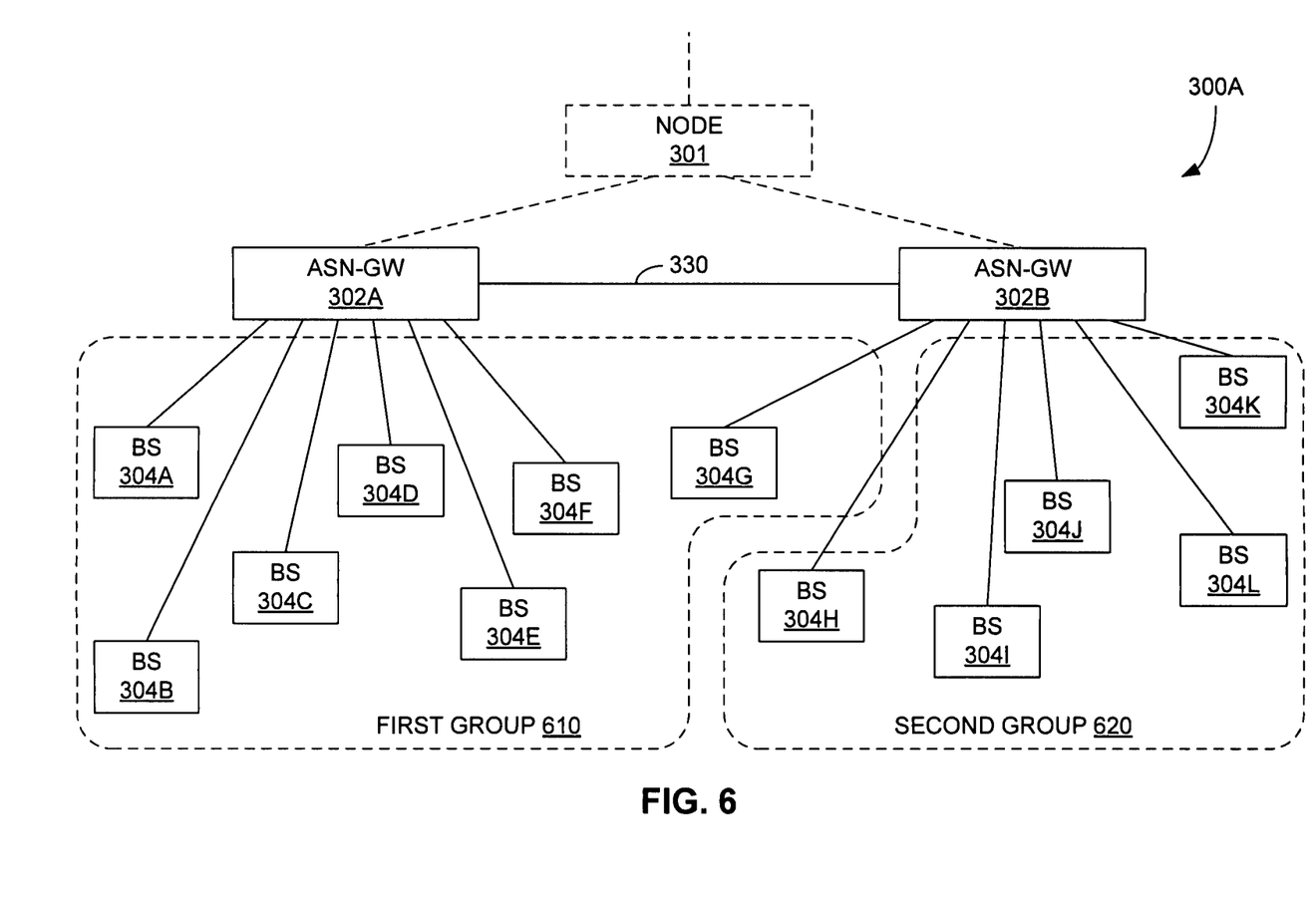
FIG. 6 is a simplified block diagram of a communication network including nodes and associated base stations apportioned into groups different from those shown in FIG. 3 according to another embodiment of the invention.

Over time, one or more of the gateways 302, or another node 301 connected thereto, may reapportion the base stations 304 among the groups 310, 320, including the creation of new groups or the deletion of preexisting groups. FIG. 6 shows reapportioned base stations 304 in which base station 304H has been transitioned from the first group 310 to the second group 320, thus forming a new first group 610 and a new second group 620. Such reapportioning may be under-taken in response to operational data of the network. Such data may include, but is not limited to, data quantifying interference between base stations 304 of different groups 310, 320, detected mobility of mobile stations between base stations 304 of different groups 310, 320, and traffic on the uplinks and downlinks of the base stations 304, as well as other forms of data mentioned above.

In another example, reapportioning of the base stations 304 may be instigated in response to expected changes in the utilization of the base stations 304. For example, if less mobility of communication devices between base stations 304 of different groups 310, 320 is expected during nighttime hours compared to what is normally experienced during the day, the first gateway 302A may begin to reapportion the groups 310, 320 to reflect that change.

Figure 7:
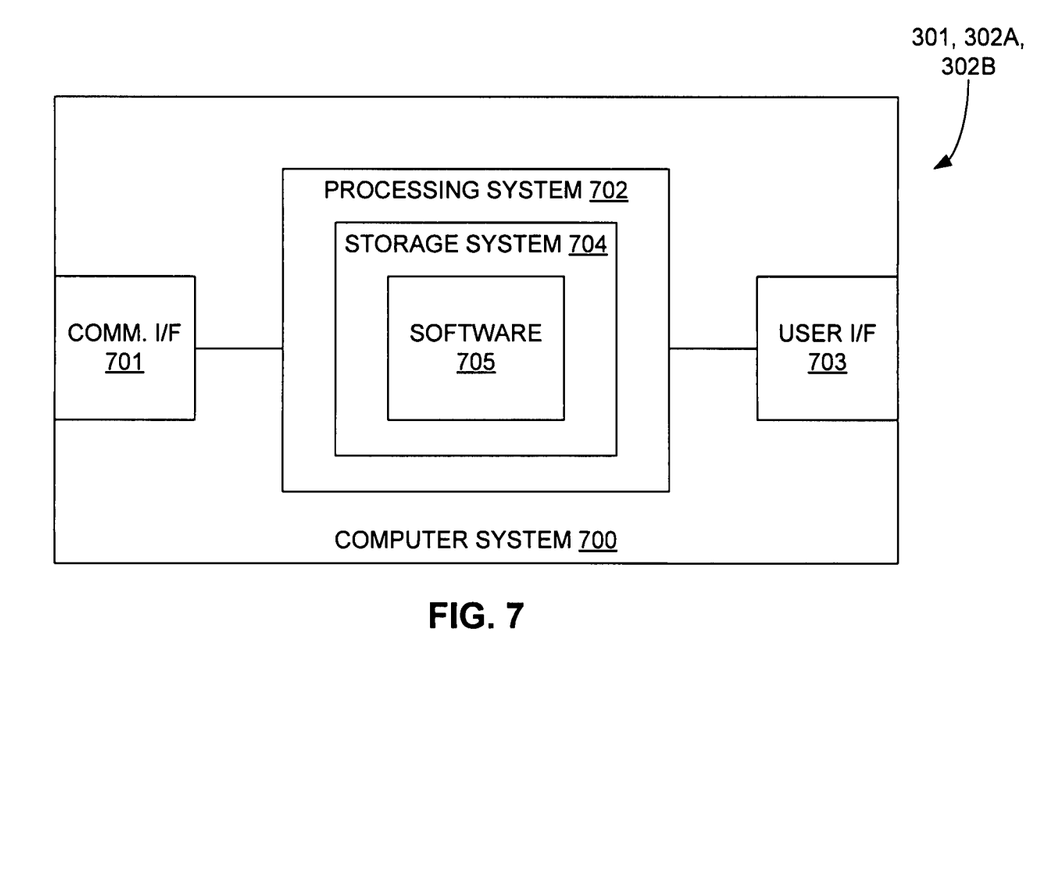
FIG. 7 is a block diagram of a computer system according to an embodiment of the invention employable as a node in a communication network that dynamically allocates capacity to uplinks and downlinks.

Any of the nodes discussed above, such as the gateways 302 or the node 301 coupled thereto, may be a computer system 700, as depicted in FIG. 7. In one example, the computer system 700 includes a communication interface 701, a processing system 702, and a user interface 703. The communication interface 701 may perform in the fashion described above in conjunction with the interface 204 of FIG. 2, while the processing system 702 may perform the operations identified with the processor 202 of FIG. 2. The processing system 702 includes a storage system 704. The storage system 704 stores software 705. The processing system 702 is linked to the communication interface 701 and the user interface 703. The computer system 700 may include a programmed general-purpose computer, although those skilled in the art will appreciate that programmable or special purpose circuitry and equipment may be used. The computer system 700 may be distributed among multiple devices that together constitute elements 701-705.

More specifically, the communication interface 701 could include a network interface, modem, port, transceiver, or some other communication device. The communication interface 701 may be employed to communicate with any of the other nodes or devices depicted in FIG. 3. The communication interface 701 may be distributed among multiple communication devices. The processing system 702 could include a computer microprocessor, logic circuit, or some other processing device. Also, the processing system 702 may be distributed among multiple processing devices. The user interface 703 could include a keyboard, mouse, voice recognition interface, microphone and speakers, graphical display, touch screen, or some other type of user device. The user interface 703 may be distributed among multiple user devices. The storage system 704 could include a disk, tape, integrated circuit, server, or some other memory device. The storage system 704 may be distributed among multiple memory devices.

The processing system 702 retrieves and executes the software 705 from the storage system 704. The software 705 may include an operating system, utilities, drivers, networking software, and other software typically loaded onto a computer system. The software 705 could include an application program, firmware, or some other form of machine-readable processing instructions. When executed by the processing system 702, the software 705 may direct the processing system 702 to perform any of the operations described above, as well as those operations illustrated in FIG. 1.

Various embodiments as described above facilitate dynamic allocation of communication capacity among uplinks and downlinks in a communication network. By apportioning base stations of a communication network into separate groups, each of which employs a potentially different uplink/downlink allocation, various portions of the network may adjust to differing uplink/downlink utilization patterns while also limiting the possibility of interference between base stations. As a result, adjustments to the uplink/downlink allocation in a group may be performed dynamically based on expected and measured changes in the network environment without deleterious effects on neighboring base stations of other groups. Further, anticipated or detected changes in the operation of the network may allow the groups to be reapportioned from time to time to facilitate further modification to achieve greater efficiency of the uplinks and downlinks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dynamically allocating capacity to uplinks and downlinks in a communication network, the method comprising:
   grouping base stations of the communication network into groups, wherein each of the base stations communicates over an uplink and a downlink with communication devices; and
   for each of the groups:
      receiving a first indication of utilization of the uplink for each of the base stations of the group;
      receiving a second indication of utilization of the downlink for each of the base stations of the group;
      determining a capacity allocation between the uplinks and the downlinks of the base stations of the group based on the first and second indications for each of the base stations of the group to synchronize a timing and a capacity of each of the uplinks of the base stations of the group to begin and end together, and to synchronize a timing and a capacity of each of the downlinks of the base stations of the group to begin and end together,
      wherein determining the capacity allocation between the uplinks and the downlinks of the base stations of the group further comprises
         eliminating statistical outliers of the first and second indications of utilization before calculating the first and second weighted averages;
         calculating a first weighted average of the first indications of utilization of the uplinks for the base stations in the group;
         calculating a second weighted average of the second indications of utilization of the downlinks for the base stations in the group; and
         generating the capacity allocation between the uplinks and the downlinks of the base stations of the group based upon the first and second weighted average;
      employing the capacity allocation for each of the base stations of the group, and
   regrouping the base stations into second groups in response to operational data of the communication network.

2. The method of claim 1, wherein the capacity allocation comprises a ratio of a length of time of a downlink sub-frame and a length of time of an uplink sub-frame of a time-division-duplex frame for each of the base stations of the group.

3. The method of claim 1, wherein the base stations of each of the groups collectively service a contiguous geographic area.

4. The method of claim 1, wherein grouping the base stations into the groups is based upon minimizing interference between the groups.

5. The method of claim 4, wherein grouping the base stations into the groups is based upon minimizing coverage overlap of base stations of different groups.

6. The method of claim 4, wherein grouping the base stations into the groups is based upon minimizing mobility of mobile stations between areas serviced by base stations of different groups.

7. The method of claim 1, wherein the operational data of the communication network comprises at least one of data quantifying interference between the base stations, data quantifying mobility of mobile stations between the base stations, and data quantifying traffic on at least one of the uplinks and the downlinks of the base stations.

8. The method of claim 1, further comprising regrouping the base stations into second groups in response to expected changes in the utilization of the base stations.

9. The method of claim 1, wherein, for each of the base stations:
the first and second indications of utilization for the base station are received from the base station.

10. The method of claim 1, wherein determining the capacity allocation between the uplinks and the downlinks of the base stations of the group further comprises:
modifying the capacity allocation based upon historical network data.

11. The method of claim 1, wherein employing the capacity allocation for each of the base stations of the group comprises communicating an indication of the capacity allocation to each of the base stations of the group.

12. The method of claim 1, further comprising:
altering at least one of separation gap lengths between the uplink and the downlink of at least one of the base stations of at least one of the groups, and handoff thresholds of at least one of the base stations of at least one of the groups.

13. A non-transitory computer-readable medium comprising instructions executable by a processor for employing a method for dynamically allocating capacity to uplinks and downlinks in a communication network, the method comprising:
grouping base stations of the communication network into groups, wherein each of the base stations communicates over an uplink and a downlink with communication devices; and
for each of the groups:
receiving a first indication of utilization of the uplink for each of the base stations of the group;
receiving a second indication of utilization of the downlink for each of the base stations of the group;
determining a capacity allocation between the uplinks and the downlinks of the base stations of the group based on the first and second indications for each of the base stations of the group to synchronize a timing and a capacity of each of the uplinks of the base stations of the group to begin and end together, and to synchronize a timing and a capacity of each of the downlinks of the base stations of the group to begin and end together,
wherein determining the capacity allocation between the uplinks and the downlinks of the base stations of the group further comprises
eliminating statistical outliers of the first and second indications of utilization before calculating the first and second weighted averages;
calculating a first weighted average of the first indications of utilization of the uplinks for the base stations in the group;
calculating a second weighted average of the second indications of utilization of the downlinks for the base stations in the group; and
generating the capacity allocation between the uplinks and the downlinks of the base stations of the group based upon the first and second weighted average;
employing the capacity allocation for each of the base stations of the group, and
regrouping the base stations into second groups in response to operational data of the communication network.

14. A node for a communication network, the node comprising:
an interface configured to communicate with a plurality of base stations of the communication network, wherein each of the plurality of base stations is configured to communicate over an uplink and a downlink with communication devices; and
a processor configured to:
group the plurality of base stations into groups; and
for each of the groups:
receive a first indication of utilization of the uplink of each of the plurality of base stations of the group over the interface;
receive a second indication of utilization of the downlink of each of the plurality of base stations of the group over the interface;
determine a capacity allocation between the uplinks and the downlinks of the plurality of base stations of the group based on the first and second indications from each of the base stations of the group to synchronize a timing and a capacity of each of the uplinks of the base stations of the group to begin and end together, and to synchronize a timing and a capacity of each of the downlinks of the base stations of the group to begin and end together, by eliminating statistical outliers of the first and second indications of utilization before calculating the first and second weighted averages, calculating a first weighted average of the first indications of utilization of the uplinks for the base stations in the group, calculating a second weighted average of the second indications of utilization of the downlinks for the base stations in the group, and generating the capacity allocation between the uplinks and the downlinks of the base stations of the group based upon the first and second weighted average;
transmit an indication of the capacity allocation to each of the plurality of base stations of the group over the interface; and
regroup the base stations into second groups in response to operational data of the communication network.

15. The node of claim 14, wherein:
the interface is configured to communicate with another node of the communication network, wherein the other node is configured to communicate with a second plurality of base stations of the communication network, and wherein at least one of the second plurality of base stations is in one of the groups; and
the processor is configured to, for each of the groups:

receive the first indication of utilization of the uplink of each of the second plurality of base stations in the group over the interface by way of the other node;
receive the second indication of utilization of the downlink of each of the second plurality of base stations in the group over the interface by way of the other node; and
transmit the indication of the capacity allocation to each of the second plurality of base stations in the group by way of the other node;
wherein determining the capacity allocation is also based on the first and second indication from each of the second plurality of base stations in the group.

16. The node of claim 14, wherein the node comprises an access service network gateway.

* * * * *